(12) United States Patent
Sasanka et al.

(10) Patent No.: US 12,124,371 B2
(45) Date of Patent: Oct. 22, 2024

(54) APPARATUS AND METHOD TO REDUCE BANDWIDTH AND LATENCY OVERHEADS OF PROBABILISTIC CACHES

(71) Applicant: Intel Corporation, Santa Clara, CA (US)

(72) Inventors: Ruchira Sasanka, Hillsboro, OR (US); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 17/214,356

(22) Filed: Mar. 26, 2021

(65) Prior Publication Data

US 2022/0308998 A1    Sep. 29, 2022

(51) Int. Cl.
*G06F 12/08* (2016.01)
*G06F 12/0815* (2016.01)
*G06F 12/0895* (2016.01)

(52) U.S. Cl.
CPC ...... *G06F 12/0815* (2013.01); *G06F 12/0895* (2013.01); *G06F 2212/608* (2013.01)

(58) Field of Classification Search
CPC .. G06F 12/08; G06F 12/0815; G06F 12/0895; G06F 2212/608; G06F 12/06; G06F 12/02
See application file for complete search history.

(56) References Cited

U.S. PATENT DOCUMENTS 9,558,120 B2 * 1/2017 Rolan ................. G06F 12/0897
11,169,560 B2   11/2021 Srinivasan et al.

(Continued)

FOREIGN PATENT DOCUMENTS

WO   WO-2016097808 A1 *  6/2016  ......... G06F 12/0864
WO   WO-2016160137 A1 * 10/2016  ......... G06F 12/0808
WO   WO-2018057245 A1 *  3/2018  ......... G06F 12/0864

OTHER PUBLICATIONS

A. Gendler, A. Bramnik, A. Szapiro and Y. Sazeides, "Don't Correct the Tags in a Cache, Just Check Their Hamming Distance from the Lookup Tag," 2018 IEEE International Symposium on High Performance Computer Architecture (HPCA), Vienna, Austria, 2018, pp. 571-582.*

(Continued)

*Primary Examiner* — Pierre Michel Bataille
(74) *Attorney, Agent, or Firm* — Nicholson De Vos Webster & Elliott LLP

(57) ABSTRACT

An apparatus and method to reduce bandwidth and latency associated with probabilistic caches. For example, one embodiment of a processor comprises: a plurality of cores to execute instructions and process data, one or more of the cores to generate a request for a first cache line; a cache controller comprising cache lookup logic to determine a first way of a cache in which to search for the first cache line based on a first set of tag bits comprising one or more bits associated with the first cache line; the cache lookup logic to compare a second set of tag bits of the first cache line with a third set of tag bits of an existing cache line stored in the first way, wherein if the second set of tag bits and the third set of tag bits to not match, then the cache lookup logic to determine that the first cache line is not in the first way and to compare a fourth set of tag bits of the first cache line with a fifth set of tag bits of the existing cache line, wherein responsive to a match between the fourth set of tag bits and the fifth set of tag bits, the cache lookup logic to determine that the first cache line is stored in a second way and to responsively read the first cache line from the second way.

40 Claims, 18 Drawing Sheets

(56) References Cited

U.S. PATENT DOCUMENTS

| | | | |
|---|---|---|---|
| 11,301,298 B2 | 4/2022 | Varma et al. | |
| 2004/0181631 A1* | 9/2004 | Clegg | G06F 12/0864 |
| | | | 711/128 |
| 2014/0047175 A1* | 2/2014 | Abali | G06F 12/0895 |
| | | | 711/E12.001 |
| 2017/0060750 A1* | 3/2017 | Krishna | G06F 12/0895 |
| 2021/0334187 A1 | 10/2021 | Sewani et al. | |
| 2022/0100247 A1 | 3/2022 | Garg et al. | |

OTHER PUBLICATIONS

J. Silberman, N. Aoki, N. Kojima and Sang Dhong, "A 1.6 ns access, 1 GHz two-way set-predicted and sum-indexed 64-kByte data cache," 2000 Symposium on VLSI Circuits. Digest of Technical Papers (Cat. No. 00CH37103), Honolulu, HI, USA, 2000, pp. 220-221.*

Chuanjun Zhang, F. Vahid, Jun Yang and W. Najjar, "A way-halting cache for low-energy high-performance systems," Proceedings of the 2004 International Symposium on Low Power Electronics and Design (IEEE Cat. No. 04TH8758), Newport Beach, CA, USA, 2004, pp. 126-131.*

Z. Xie, D. Tong and X. Cheng, "WHOLE: A low energy I-Cache with separate way history," 2009 IEEE International Conference on Computer Design, Lake Tahoe, CA, USA, 2009, pp. 137-143.*

M. K. Qureshi, D. Thompson and Y. N. Patt, "The V-Way cache: demand-based associativity via global replacement," 32nd International Symposium on Computer Architecture (ISCA'05), Madison, WI, USA, 2005, pp. 544-555.*

* cited by examiner

| TAG (4 bits) 1401 | INDEX (4 bits) 1402 |

*Fig. 14A*

| TAG (5 bits) 1411 | INDEX (3 bits) 1412 |

*Fig. 14B*

| 4 MSB OF 2-WAY TAG 1421 | X (LSB of TAG) 1422 | INDEX (3 BITS) 1412 |

*Fig. 14C*

| 2-WAY TAG (4 BITS) 1521 | EXTRA TAG (3 BITS) 1522 | 64B DATA (AND OTHER BITS AS CRC) 1523 |

*Fig. 16*

APPARATUS AND METHOD TO REDUCE BANDWIDTH AND LATENCY OVERHEADS OF PROBABILISTIC CACHES

BACKGROUND

Field of the Invention

The embodiments of the invention relate generally to the field of computer processors. More particularly, the embodiments relate to an apparatus and method to reduce bandwidth and latency overheads of probabilistic caches, such as HBM caches.

Description of the Related Art

In implementations where High Bandwidth Memory (HBM) is configured as a cache, the HBM-cache is typically direct-mapped because the size of the HBM storage capacity (e.g., 10s of GBs) makes separate tag arrays impractical. Consequently, each tag is stored along with the corresponding cache line. A probabilistic-2way (P2w) cache has been used to alleviate the conflicts inherent in such direct mapped caches. However, P2w caches significantly increase the bandwidth and miss-latency of a direct mapped cache, making P2w caches unattractive for productization.

BRIEF DESCRIPTION OF THE DRAWINGS

A better understanding of the present invention can be obtained from the following detailed description in conjunction with the following drawings, in which:

FIGS. 14A-C illustrate concepts associated with direct-mapped, two-way, and probabilistic two-way caches;

FIG. 16 illustrates one embodiment of a cache line comprising a 2-way tag and an extra tag;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
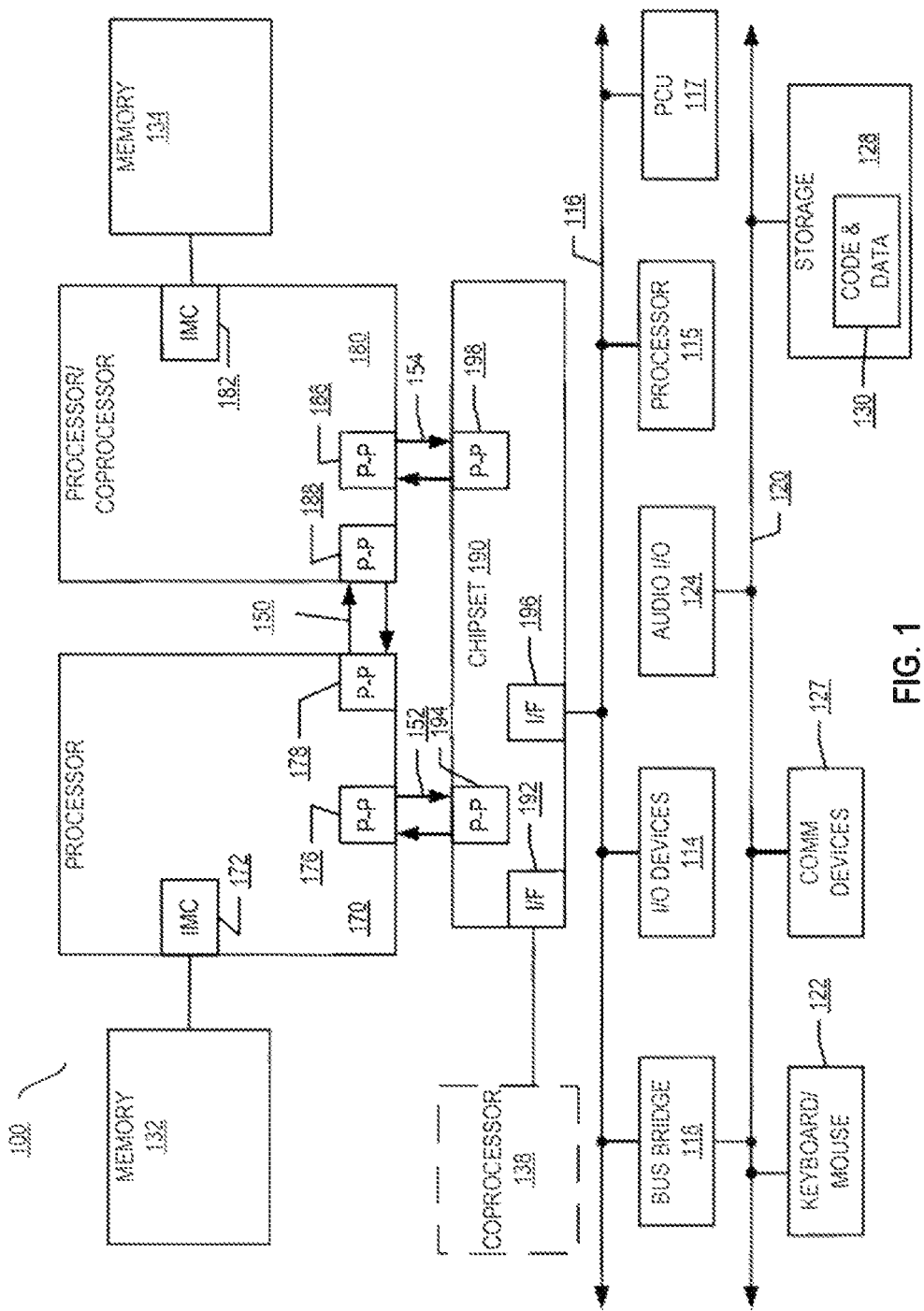
FIG. 1 illustrates an example computer system architecture.

FIG. 1 illustrates embodiments of an exemplary system. Multiprocessor system 100 is a point-to-point interconnect system and includes a plurality of processors including a first processor 170 and a second processor 180 coupled via a point-to-point interconnect 150. In some embodiments, the first processor 170 and the second processor 180 are homogeneous. In some embodiments, first processor 170 and the second processor 180 are heterogenous.

Processors 170 and 180 are shown including integrated memory controller (IMC) units circuitry 172 and 182, respectively. Processor 170 also includes as part of its interconnect controller units point-to-point (P-P) interfaces 176 and 178; similarly, second processor 180 includes P-P interfaces 186 and 188. Processors 170, 180 may exchange information via the point-to-point (P-P) interconnect 150 using P-P interface circuits 178, 188. IMCs 172 and 182 couple the processors 170, 180 to respective memories, namely a memory 132 and a memory 134, which may be portions of main memory locally attached to the respective processors.

Processors 170, 180 may each exchange information with a chipset 190 via individual P-P interconnects 152, 154 using point to point interface circuits 176, 194, 186, 198. Chipset 190 may optionally exchange information with a coprocessor 138 via a high-performance interface 192. In some embodiments, the coprocessor 138 is a special-purpose processor, such as, for example, a high-throughput MIC processor, a network or communication processor, compression engine, graphics processor, GPGPU, embedded processor, or the like.

A shared cache (not shown) may be included in either processor 170, 180 or outside of both processors, yet connected with the processors via P-P interconnect, such that either or both processors' local cache information may be stored in the shared cache if a processor is placed into a low power mode.

Chipset 190 may be coupled to a first interconnect 116 via an interface 196. In some embodiments, first interconnect 116 may be a Peripheral Component Interconnect (PCI) interconnect, or an interconnect such as a PCI Express interconnect or another I/O interconnect. In some embodiments, one of the interconnects couples to a power control unit (PCU) 117, which may include circuitry, software, and/or firmware to perform power management operations with regard to the processors 170, 180 and/or co-processor 138. PCU 117 provides control information to a voltage regulator to cause the voltage regulator to generate the appropriate regulated voltage. PCU 117 also provides control information to control the operating voltage generated. In various embodiments, PCU 117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 117 is illustrated as being present as logic separate from the processor 170 and/or processor 180. In other cases, PCU 117 may execute on a given one or more of cores (not shown) of processor 170 or 180. In some cases, PCU 117 may be implemented as a microcontroller (dedicated or general-purpose) or other control logic configured to execute its own dedicated power management code, sometimes referred to as P-code. In yet other embodiments, power management operations to be performed by PCU 117 may be implemented externally to a processor, such as by way of a separate power management integrated circuit (PMIC) or another component external to the processor. In yet other embodiments, power management operations to be performed by PCU 117 may be implemented within BIOS or other system software.

Various I/O devices 114 may be coupled to first interconnect 116, along with an interconnect (bus) bridge 118 which couples first interconnect 116 to a second interconnect 120. In some embodiments, one or more additional processor(s) 115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 116. In some embodiments, second interconnect 120 may be a low pin count (LPC) interconnect. Various devices may be coupled to second interconnect 120 including, for example, a keyboard and/or mouse 122, communication devices 127 and a storage unit circuitry 128. Storage unit circuitry 128 may be a disk drive or other mass storage device which may include instructions/code and data 130, in some embodiments. Further, an audio I/O 124 may be coupled to second interconnect 120. Note that other architectures than the point-to-point architecture described above are possible. For example, instead of the point-to-point architecture, a system such as multiprocessor system 100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 2:
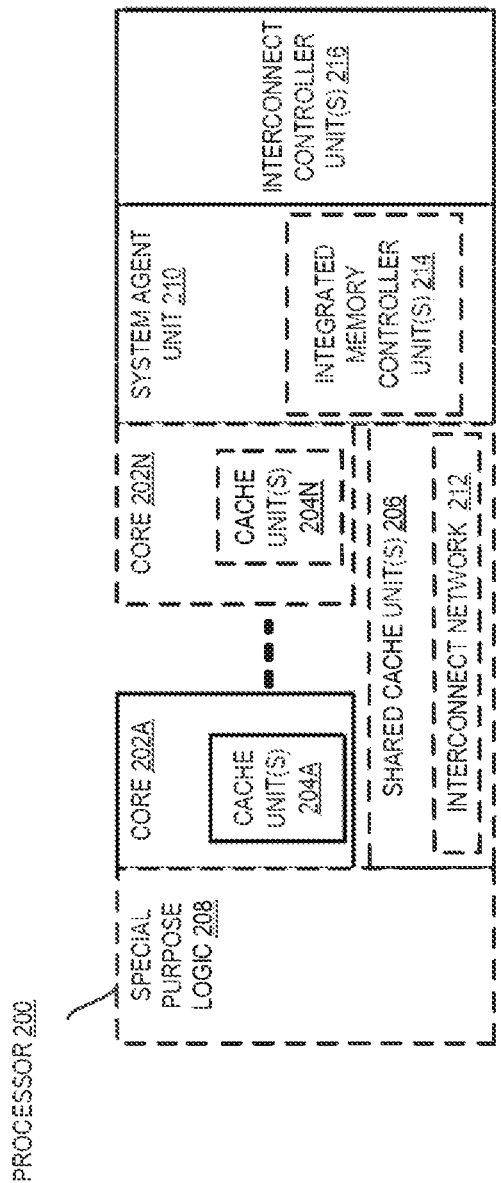
FIG. 2 illustrates a processor comprising a plurality of cores.

FIG. 2 illustrates a block diagram of embodiments of a processor 200 that may have more than one core, may have an integrated memory controller, and may have integrated graphics. The solid lined boxes illustrate a processor 200 with a single core 202A, a system agent 210, a set of one or more interconnect controller units circuitry 216, while the optional addition of the dashed lined boxes illustrates an alternative processor 200 with multiple cores 202(A)-(N), a set of one or more integrated memory controller unit(s) circuitry 214 in the system agent unit circuitry 210, and special purpose logic 208, as well as a set of one or more interconnect controller units circuitry 216. Note that the processor 200 may be one of the processors 170 or 180, or co-processor 138 or 115 of FIG. 1.

Thus, different implementations of the processor 200 may include: 1) a CPU with the special purpose logic 208 being integrated graphics and/or scientific (throughput) logic (which may include one or more cores, not shown), and the cores 202(A)-(N) being one or more general purpose cores (e.g., general purpose in-order cores, general purpose out-of-order cores, or a combination of the two); 2) a coprocessor with the cores 202(A)-(N) being a large number of special purpose cores intended primarily for graphics and/or scientific (throughput); and 3) a coprocessor with the cores 202(A)-(N) being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

A memory hierarchy includes one or more levels of cache unit(s) circuitry 204(A)-(N) within the cores 202(A)-(N), a set of one or more shared cache units circuitry 206, and external memory (not shown) coupled to the set of integrated memory controller units circuitry 214. The set of one or more shared cache units circuitry 206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 212 interconnects the special purpose logic 208 (e.g., integrated graphics logic), the set of shared cache units circuitry 206, and the system agent unit circuitry 210, alternative embodiments use any number of well-known techniques for interconnecting such units. In some embodiments, coherency is maintained between one or more of the shared cache units circuitry 206 and cores 202(A)-(N).

In some embodiments, one or more of the cores 202(A)-(N) are capable of multi-threading. The system agent unit circuitry 210 includes those components coordinating and operating cores 202(A)-(N). The system agent unit circuitry 210 may include, for example, power control unit (PCU) circuitry and/or display unit circuitry (not shown). The PCU may be or may include logic and components needed for regulating the power state of the cores 202(A)-(N) and/or the special purpose logic 208 (e.g., integrated graphics logic). The display unit circuitry is for driving one or more externally connected displays.

The cores 202(A)-(N) may be homogenous or heterogeneous in terms of architecture instruction set; that is, two or more of the cores 202(A)-(N) may be capable of executing the same instruction set, while other cores may be capable of executing only a subset of that instruction set or a different instruction set.

Exemplary Core Architectures
In-Order and Out-of-Order Core Block Diagram

Figure 3A:
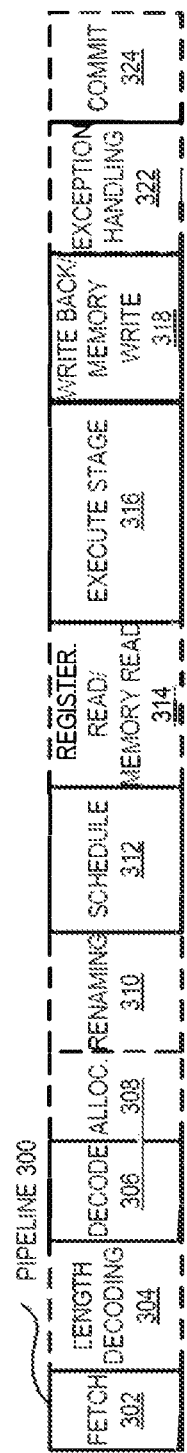
FIG. 3A illustrates a plurality of stages of a processing pipeline.
Figure 3B:
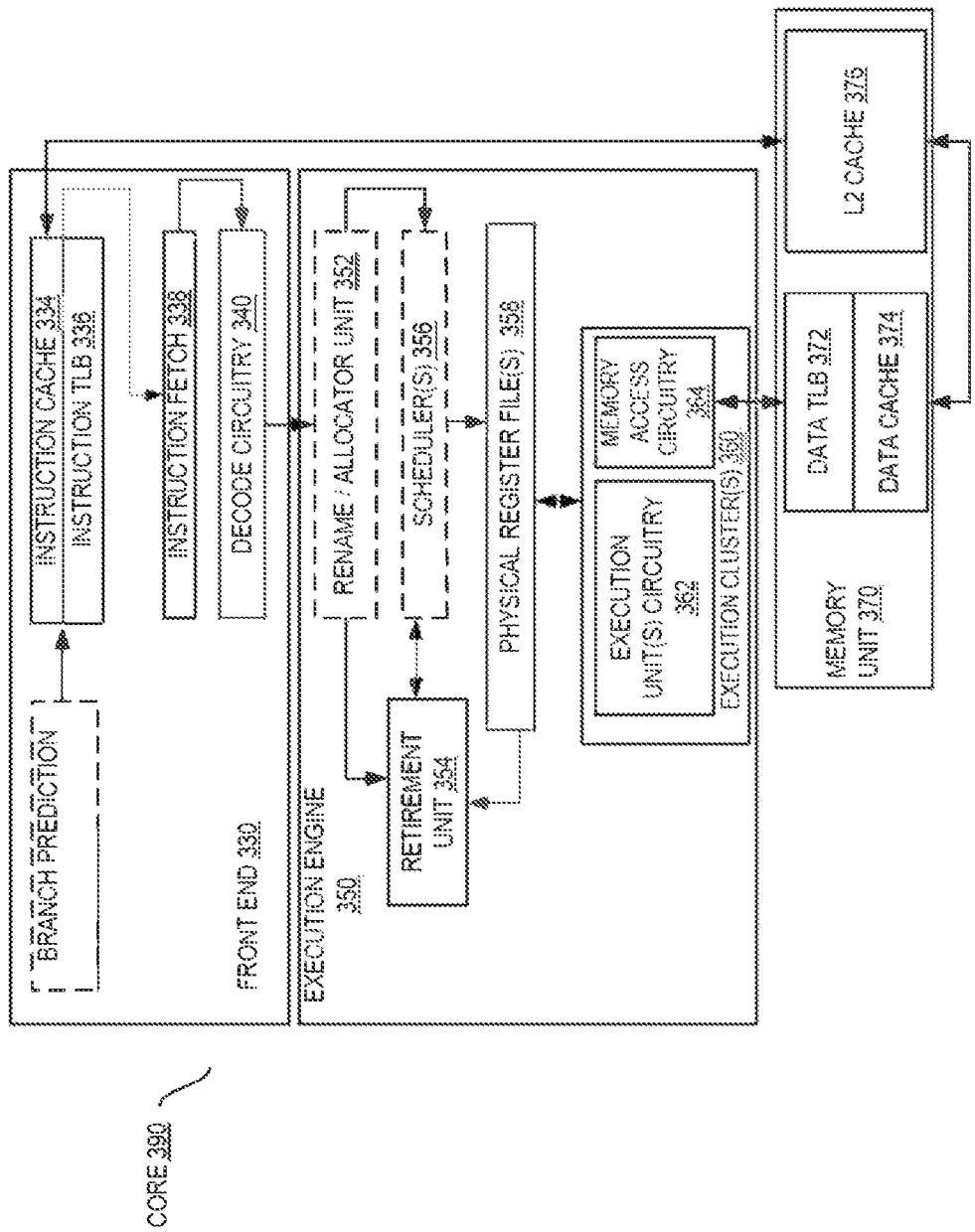
FIG. 3B illustrates details of one embodiment of a core.

FIG. 3(A) is a block diagram illustrating both an exemplary in-order pipeline and an exemplary register renaming, out-of-order issue/execution pipeline according to embodiments of the invention. FIG. 3(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 3(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3(A), a processor pipeline 300 includes a fetch stage 302, an optional length decode stage 304, a decode stage 306, an optional allocation stage 308, an optional renaming stage 310, a scheduling (also known as a dispatch or issue) stage 312, an optional register read/memory read stage 314, an execute stage 316, a write back/memory write stage 318, an optional exception handling stage 322, and an optional commit stage 324. One or more operations can be performed in each of these processor pipeline stages. For example, during the fetch stage 302, one or more instructions are fetched from instruction memory, during the decode stage 306, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 306 and the register read/memory read stage 314 may be combined into one pipeline stage. In one embodiment, during the execute stage 316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 300 as follows: 1) the instruction fetch 338 performs the fetch and length decoding stages 302 and 304; 2) the decode unit circuitry 340 performs the decode stage 306; 3) the rename/allocator unit circuitry 352 performs the allocation stage 308 and renaming stage 310; 4) the scheduler unit(s) circuitry 356 performs the schedule stage 312; 5) the physical register file(s) unit(s) circuitry 358 and the memory unit circuitry 370 perform the register read/memory read stage 314; the execution cluster 360 perform the execute stage 316; 6) the memory unit circuitry 370 and the physical register file(s) unit(s) circuitry 358 perform the write back/memory write stage 318; 7) various units (unit circuitry) may be involved in the exception handling stage 322; and 8) the retirement unit circuitry 354 and the physical register file(s) unit(s) circuitry 358 perform the commit stage 324.

FIG. 3(B) shows processor core 390 including front-end unit circuitry 330 coupled to an execution engine unit circuitry 350, and both are coupled to a memory unit circuitry 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit circuitry 330 may include branch prediction unit circuitry 332 coupled to an instruction cache unit circuitry 334, which is coupled to an instruction translation lookaside buffer (TLB) 336, which is coupled to instruction fetch unit circuitry 338, which is coupled to decode unit circuitry 340. In one embodiment, the instruction cache unit circuitry 334 is included in the memory unit circuitry 370 rather than the front-end unit circuitry 330. The decode unit circuitry 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM (not shown) or other medium that stores microcode for certain macroinstructions (e.g., in decode unit circuitry 340 or otherwise within the front end unit circuitry 330). In one embodiment, the decode unit circuitry 340 includes a micro-operation (micro-op) or operation cache (not shown) to hold/cache decoded operations, micro-tags, or micro-operations generated during the decode or other stages of the processor pipeline 300. The decode unit circuitry 340 may be coupled to rename/allocator unit circuitry 352 in the execution engine unit circuitry 350.

The execution engine circuitry 350 includes the rename/allocator unit circuitry 352 coupled to a retirement unit circuitry 354 and a set of one or more scheduler(s) circuitry 356. The scheduler(s) circuitry 356 represents any number of different schedulers, including reservations stations, central instruction window, etc. In some embodiments, the scheduler(s) circuitry 356 can include arithmetic logic unit (ALU) scheduler/scheduling circuitry, ALU queues, arithmetic generation unit (AGU) scheduler/scheduling circuitry, AGU queues, etc. The scheduler(s) circuitry 356 is coupled to the physical register file(s) circuitry 358. Each of the physical register file(s) circuitry 358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 358 includes vector registers unit circuitry, writemask registers unit circuitry, and scalar register unit circuitry. These register units may provide architectural vector registers, vector mask registers, general-purpose registers, etc. The physical register file(s) unit(s) circuitry 358 is overlapped by the retirement unit circuitry 354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 354 and the physical register file(s) circuitry 358 are coupled to the execution cluster(s) 360. The execution cluster(s) 360 includes a set of one or more execution units circuitry 362 and a set of one or more memory access circuitry 364. The execution units circuitry 362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 356, physical register file(s) unit(s) circuitry 358, and execution cluster(s) 360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 364). It should also be understood that where separate pipelines are used, one or more of these pipelines may be out-of-order issue/execution and the rest in-order.

In some embodiments, the execution engine unit circuitry 350 may perform load store unit (LSU) address/data pipelining to an Advanced Microcontroller Bus (AHB) interface (not shown), and address phase and writeback, data phase load, store, and branches.

The set of memory access circuitry 364 is coupled to the memory unit circuitry 370, which includes data TLB unit circuitry 372 coupled to a data cache circuitry 374 coupled to a level 2 (L2) cache circuitry 376. In one exemplary embodiment, the memory access units circuitry 364 may include a load unit circuitry, a store address unit circuit, and a store data unit circuitry, each of which is coupled to the data TLB circuitry 372 in the memory unit circuitry 370. The instruction cache circuitry 334 is further coupled to a level 2 (L2) cache unit circuitry 376 in the memory unit circuitry 370. In one embodiment, the instruction cache 334 and the data cache 374 are combined into a single instruction and data cache (not shown) in L2 cache unit circuitry 376, a level 3 (L3) cache unit circuitry (not shown), and/or main memory. The L2 cache unit circuitry 376 is coupled to one or more other levels of cache and eventually to a main memory.

The core 390 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 390 includes logic to support a packed data instruction set extension (e.g., AVX1, AVX2), thereby allowing the operations used by many multimedia applications to be performed using packed data.

Exemplary Execution Unit(s) Circuitry

Figure 4:
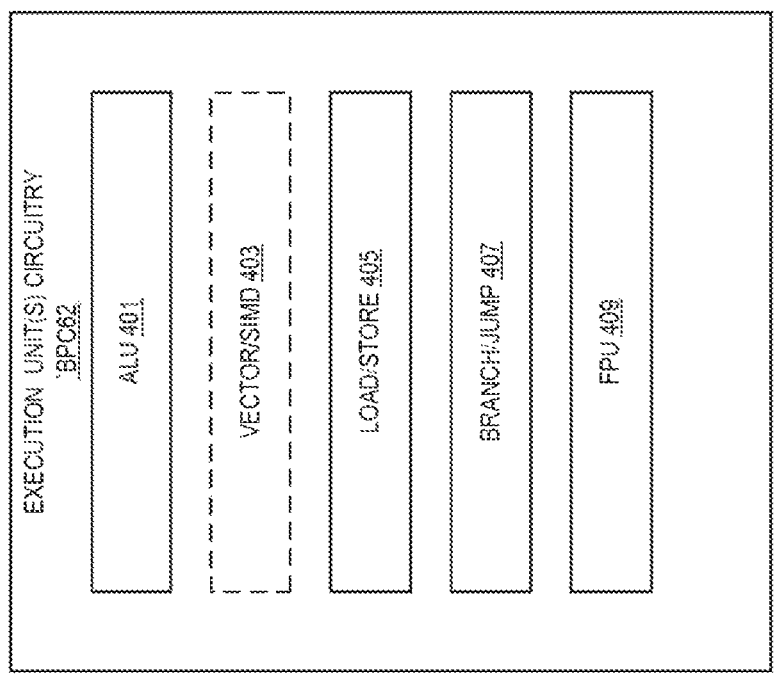
FIG. 4 illustrates execution circuitry in accordance with one embodiment.

FIG. 4 illustrates embodiments of execution unit(s) circuitry, such as execution unit(s) circuitry 362 of FIG. 3(B). As illustrated, execution unit(s) circuitry 362 may include one or more ALU circuits 401, vector/SIMD unit circuits 403, load/store unit circuits 405, and/or branch/jump unit circuits 407. ALU circuits 401 perform integer arithmetic and/or Boolean operations. Vector/SIMD unit circuits 403 perform vector/SIMD operations on packed data (such as SIMD/vector registers). Load/store unit circuits 405 execute load and store instructions to load data from memory into registers or store from registers to memory. Load/store unit circuits 405 may also generate addresses. Branch/jump unit circuits 407 cause a branch or jump to a memory address depending on the instruction. Floating-point unit (FPU) circuits 409 perform floating-point arithmetic. The width of the execution unit(s) circuitry 362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 5:
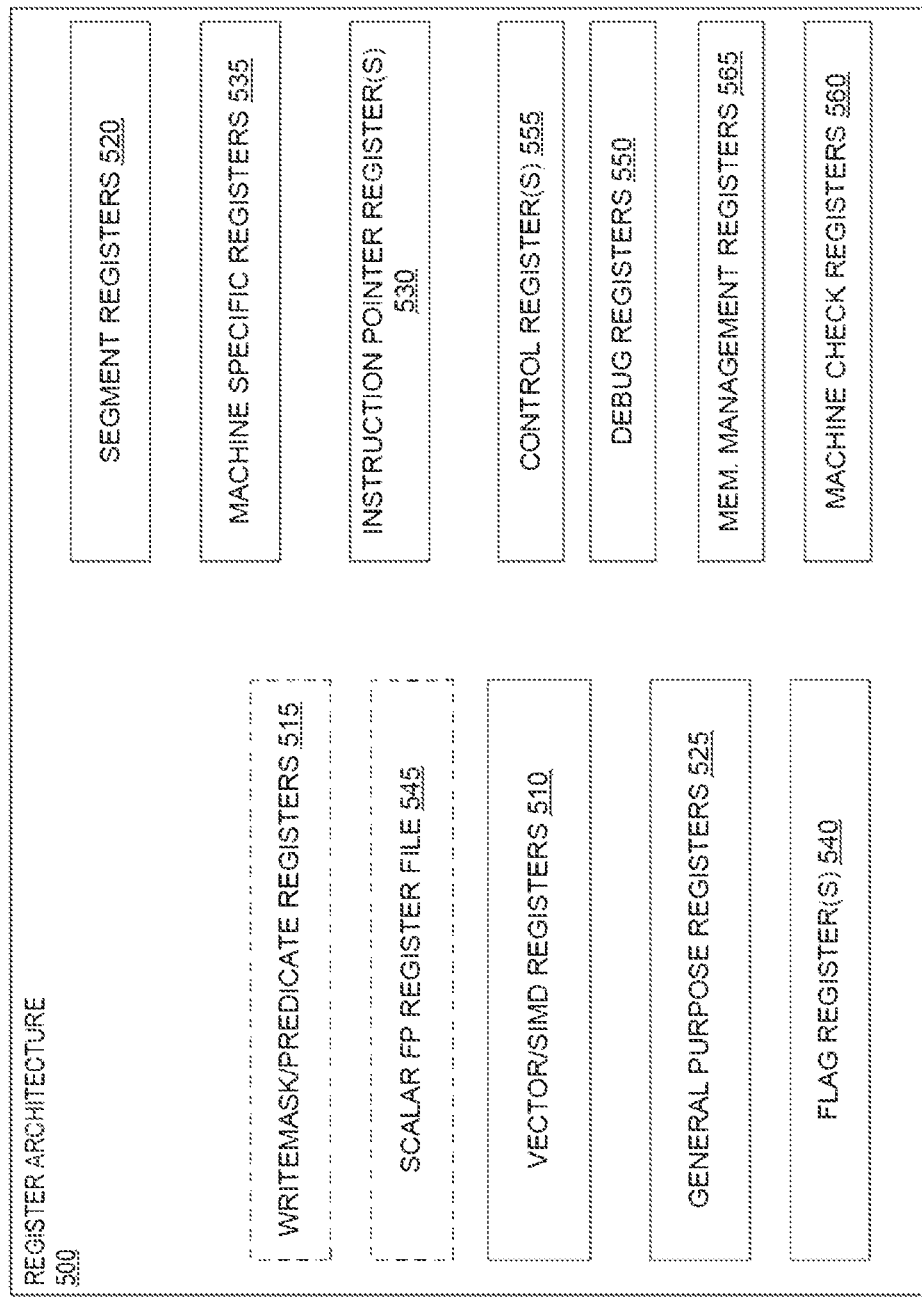
FIG. 5 illustrates one embodiment of a register architecture.

FIG. 5 is a block diagram of a register architecture 500 according to some embodiments. As illustrated, there are vector/SIMD registers 510 that vary from 128-bit to 1,024 bits width. In some embodiments, the vector/SIMD registers 510 are physically 512-bits and, depending upon the mapping, only some of the lower bits are used. For example, in some embodiments, the vector/SIMD registers 510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 500 includes writemask/predicate registers 515. For example, in some embodiments, there are 8 writemask/predicate registers (sometimes called k0 through k7) that are each 16-bit, 32-bit, 64-bit, or 128-bit in size. Writemask/predicate registers 515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 515 corresponds to a data element position of the destination. In other embodiments, the writemask/predicate registers 515 are scalable and consists of a set number of enable bits for a given vector element (e.g., 8 enable bits per 64-bit vector element).

The register architecture 500 includes a plurality of general-purpose registers 525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 500 includes scalar floating-point register 545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 540 (e.g., EFLAGS, RFLAGS, etc.) store status and control information for arithmetic, compare, and system operations. For example, the one or more flag registers 540 may store condition code information such as carry, parity, auxiliary carry, zero, sign, and overflow. In some embodiments, the one or more flag registers 540 are called program status and control registers.

Segment registers 520 contain segment points for use in accessing memory. In some embodiments, these registers are referenced by the names CS, DS, SS, ES, FS, and GS.

Machine specific registers (MSRs) 535 control and report on processor performance. Most MSRs 535 handle system-related functions and are not accessible to an application program. Machine check registers 560 consist of control, status, and error reporting MSRs that are used to detect and report on hardware errors.

One or more instruction pointer register(s) 530 store an instruction pointer value. Control register(s) 555 (e.g., CR0-CR4) determine the operating mode of a processor (e.g., processor 170, 180, 138, 115, and/or 200) and the characteristics of a currently executing task. Debug registers 550 control and allow for the monitoring of a processor or core's debugging operations.

Memory management registers 565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 6:
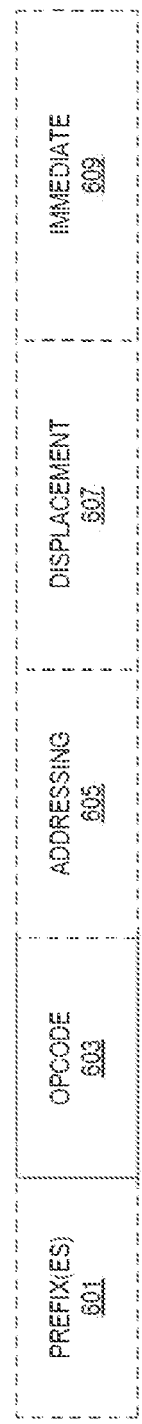
FIG. 6 illustrates one example of an instruction format.

FIG. 6 illustrates embodiments of an instruction format. As illustrated, an instruction may include multiple components including, but not limited to, one or more fields for: one or more prefixes 601, an opcode 603, addressing information 605 (e.g., register identifiers, memory addressing information, etc.), a displacement value 607, and/or an immediate 609. Note that some instructions utilize some or all of the fields of the format whereas others may only use the field for the opcode 603. In some embodiments, the order illustrated is the order in which these fields are to be encoded, however, it should be appreciated that in other embodiments these fields may be encoded in a different order, combined, etc.

The prefix(es) field(s) 601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0)(26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 603 is used to at least partially define the operation to be performed upon a decoding of the instruction. In some embodiments, a primary opcode encoded in the opcode field 603 is 1, 2, or 3 bytes in length. In other embodiments, a primary opcode can be a different length. An additional 3-bit opcode field is sometimes encoded in another field.

Figure 7:
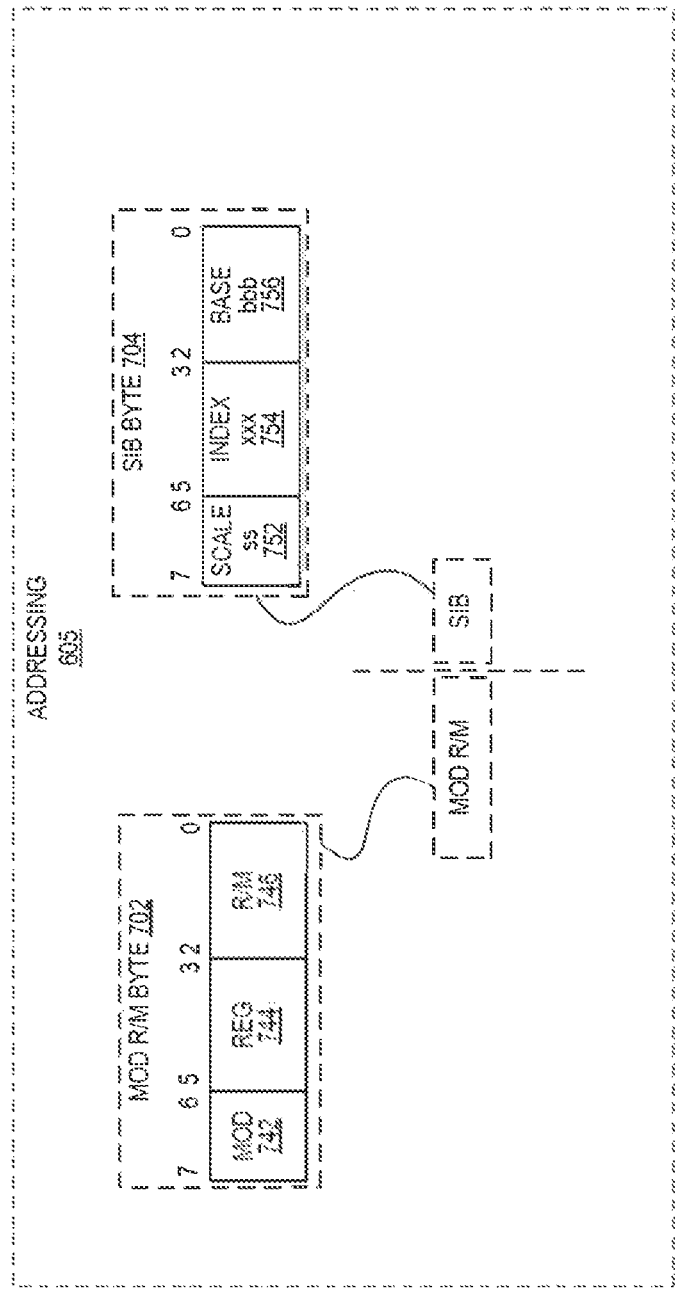
FIG. 7 illustrates addressing techniques in accordance with one embodiment.

The addressing field 605 is used to address one or more operands of the instruction, such as a location in memory or one or more registers. FIG. 7 illustrates embodiments of the addressing field 605. In this illustration, an optional ModR/M byte 702 and an optional Scale, Index, Base (SIB) byte 704 are shown. The ModR/M byte 702 and the SIB byte 704 are used to encode up to two operands of an instruction, each of which is a direct register or effective memory address. Note that each of these fields are optional in that not all instructions include one or more of these fields. The MOD R/M byte 702 includes a MOD field 742, a register field 744, and R/M field 746.

The content of the MOD field 742 distinguishes between memory access and non-memory access modes. In some embodiments, when the MOD field 742 has a value of b11, a register-direct addressing mode is utilized, and otherwise register-indirect addressing is used.

The register field 744 may encode either the destination register operand or a source register operand, or may encode an opcode extension and not be used to encode any instruction operand. The content of register index field 744, directly or through address generation, specifies the locations of a source or destination operand (either in a register or in memory). In some embodiments, the register field 744 is supplemented with an additional bit from a prefix (e.g., prefix 601) to allow for greater addressing.

The R/M field 746 may be used to encode an instruction operand that references a memory address, or may be used to encode either the destination register operand or a source register operand. Note the R/M field 746 may be combined with the MOD field 742 to dictate an addressing mode in some embodiments.

The SIB byte 704 includes a scale field 752, an index field 754, and a base field 756 to be used in the generation of an address. The scale field 752 indicates scaling factor. The index field 754 specifies an index register to use. In some embodiments, the index field 754 is supplemented with an additional bit from a prefix (e.g., prefix 601) to allow for greater addressing. The base field 756 specifies a base register to use. In some embodiments, the base field 756 is supplemented with an additional bit from a prefix (e.g., prefix 601) to allow for greater addressing. In practice, the content of the scale field 752 allows for the scaling of the content of the index field 754 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 607 provides this value. Additionally, in some embodiments, a displacement factor usage is encoded in the MOD field of the addressing field 605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 607.

In some embodiments, an immediate field 609 specifies an immediate for the instruction. An immediate may be encoded as a 1-byte value, a 2-byte value, a 4-byte value, etc.

Figure 8:
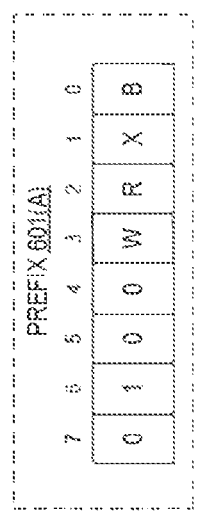
FIG. 8 illustrates one embodiment of an instruction prefix.

FIG. 8 illustrates embodiments of a first prefix 601(A). In some embodiments, the first prefix 601(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 601(A) may specify up to three registers using 3-bit fields depending on the format: 1) using the reg field 744 and the R/M field 746 of the Mod R/M byte 702; 2) using the Mod R/M byte 702 with the SIB byte 704 including using the reg field 744 and the base field 756 and index field 754; or 3) using the register field of an opcode.

In the first prefix 601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 744 and MOD R/M R/M field 746 alone can each only address 8 registers.

In the first prefix 601(A), bit position 2 (R) may an extension of the MOD R/M reg field 744 and may be used to modify the ModR/M reg field 744 when that field encodes a general purpose register, a 64-bit packed data register (e.g., a SSE register), or a control or debug register. R is ignored when Mod R/M byte 702 specifies other registers or defines an extended opcode.

Bit position 1 (X) X bit may modify the SIB byte index field 754.

Bit position B (B) B may modify the base in the Mod R/M R/M field 746 or the SIB byte base field 756; or it may modify the opcode register field used for accessing general purpose registers (e.g., general purpose registers 525).

Figure 9A:
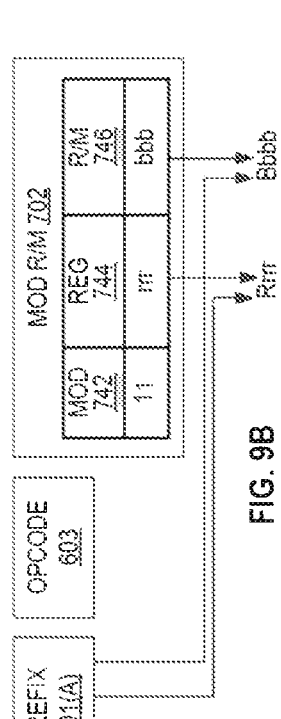
FIGS. 9A-D illustrate embodiments of how the R, X, and B fields of the prefix are used.
Figure 9B:
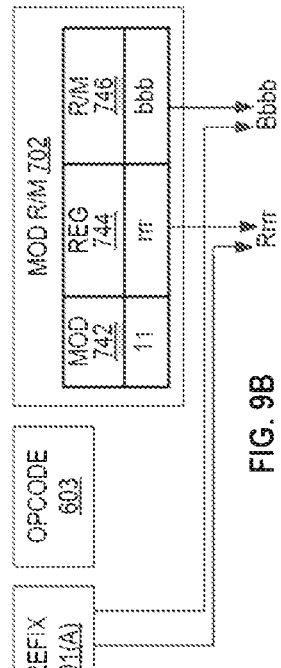
Figure 9C:
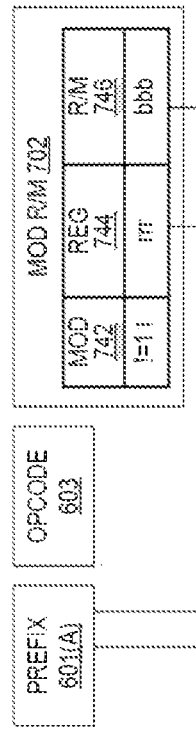
Figure 9D:
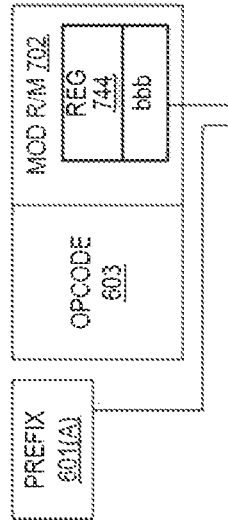

FIGS. 9(A)-(D) illustrate embodiments of how the R, X, and B fields of the first prefix 601(A) are used. FIG. 9(A) illustrates R and B from the first prefix 601(A) being used to extend the reg field 744 and R/M field 746 of the MOD R/M byte 702 when the SIB byte 704 is not used for memory addressing. FIG. 9(B) illustrates R and B from the first prefix 601(A) being used to extend the reg field 744 and R/M field 746 of the MOD R/M byte 702 when the SIB byte 704 is not used (register-register addressing). FIG. 9(C) illustrates R, X, and B from the first prefix 601(A) being used to extend the reg field 744 of the MOD R/M byte 702 and the index field 754 and base field 756 when the SIB byte 704 being used for memory addressing. FIG. 9(D) illustrates B from the first prefix 601(A) being used to extend the reg field 744 of the MOD R/M byte 702 when a register is encoded in the opcode 603.

Figure 10A:
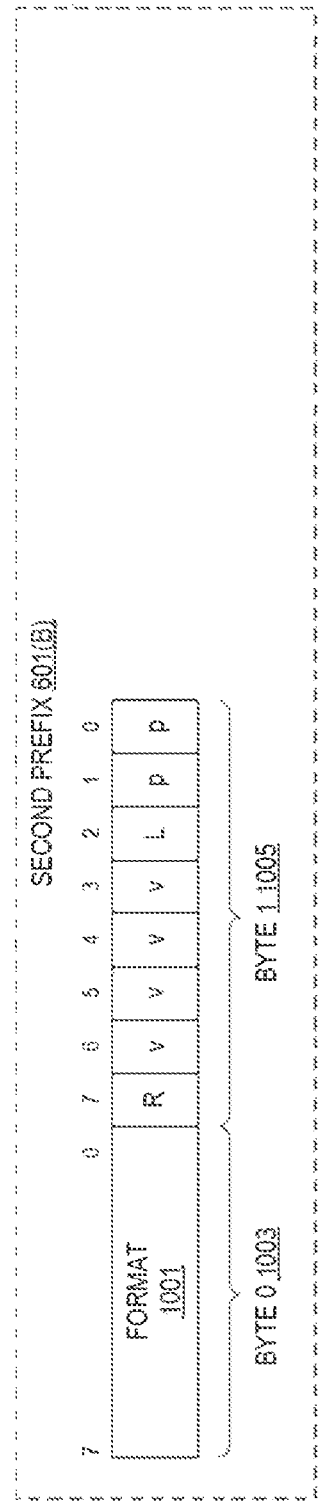
FIGS. 10A-B illustrate examples of a second instruction prefix.
Figure 10B:
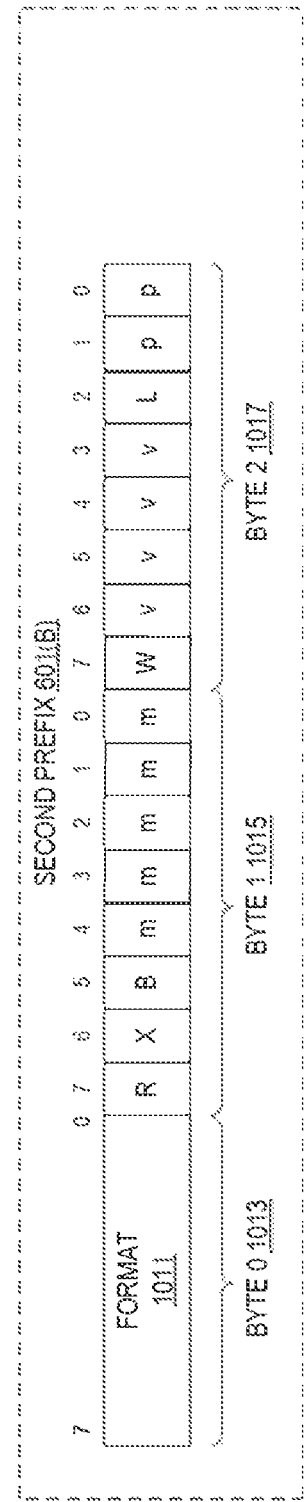

FIGS. 10(A)-(B) illustrate embodiments of a second prefix 601(B). In some embodiments, the second prefix 601(B) is an embodiment of a VEX prefix. The second prefix 601(B) encoding allows instructions to have more than two operands, and allows SIMD vector registers (e.g., vector/SIMD registers 510) to be longer than 64-bits (e.g., 128-bit and 256-bit). The use of the second prefix 601(B) provides for three-operand (or more) syntax. For example, previous two-operand instructions performed operations such as A=A+B, which overwrites a source operand. The use of the second prefix 601(B) enables operands to perform nondestructive operations such as A=B+C.

In some embodiments, the second prefix 601(B) comes in two forms—a two-byte form and a three-byte form. The two-byte second prefix 601(B) is used mainly for 128-bit, scalar, and some 256-bit instructions; while the three-byte second prefix 601(B) provides a compact replacement of the first prefix 601(A) and 3-byte opcode instructions.

FIG. 10(A) illustrates embodiments of a two-byte form of the second prefix 601(B). In one example, a format field 1001 (byte 0 1003) contains the value C5H. In one example, byte 1 1005 includes a "R" value in bit[7]. This value is the complement of the same value of the first prefix 601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746 and the Mod R/M reg field 744 encode three of the four operands. Bits[7:4] of the immediate 609 are then used to encode the third source register operand.

FIG. 10(B) illustrates embodiments of a three-byte form of the second prefix 601(B). in one example, a format field 1011 (byte 0 1013) contains the value C4H. Byte 1 1015 includes in bits[7:5] "R," "X," and "B" which are the complements of the same values of the first prefix 601(A). Bits[4:0] of byte 1 1015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1017 is used similar to W of the first prefix 601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746, and the Mod R/M reg field 744 encode three of the four operands. Bits[7:4] of the immediate 609 are then used to encode the third source register operand.

Figure 11:
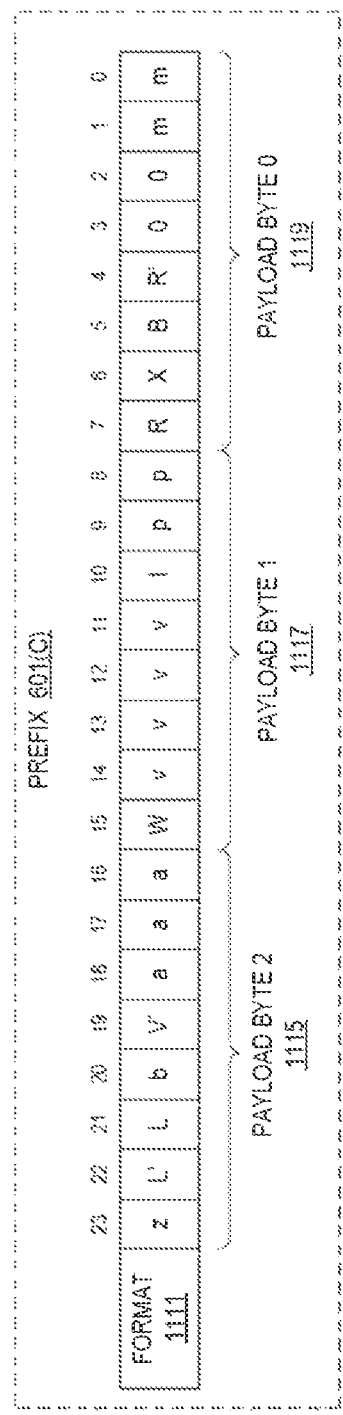
FIG. 11 illustrates payload bytes of one embodiment of an instruction prefix.

FIG. 11 illustrates embodiments of a third prefix 601(C). In some embodiments, the first prefix 601(A) is an embodiment of an EVEX prefix. The third prefix 601(C) is a four-byte prefix.

The third prefix 601(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 5) or predication utilize this prefix. Opmask register allow for conditional processing or selection control. Opmask instructions, whose source/destination operands are opmask registers and treat the content of an opmask register as a single value, are encoded using the second prefix 601(B).

The third prefix 601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 601(C) is a format field 1111 that has a value, in one example, of 62H. Subsequent bytes are referred to as payload bytes 1115-1119 and collectively form a 24-bit value of P[23:0] providing specific capability in the form of one or more fields (detailed herein).

In some embodiments, P[1:0] of payload byte 1119 are identical to the low two mmmmm bits. P[3:2] are reserved in some embodiments. Bit P[4] (R') allows access to the high 16 vector register set when combined with P[7] and the ModR/M reg field 744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 744 and ModR/M R/M field 746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 601(A) and second prefix 611(B) and may serve as an opcode extension bit or operand size promotion.

P[18:16] specify the index of a register in the opmask (writemask) registers (e.g., writemask/predicate registers 515). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 601(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | k0$^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
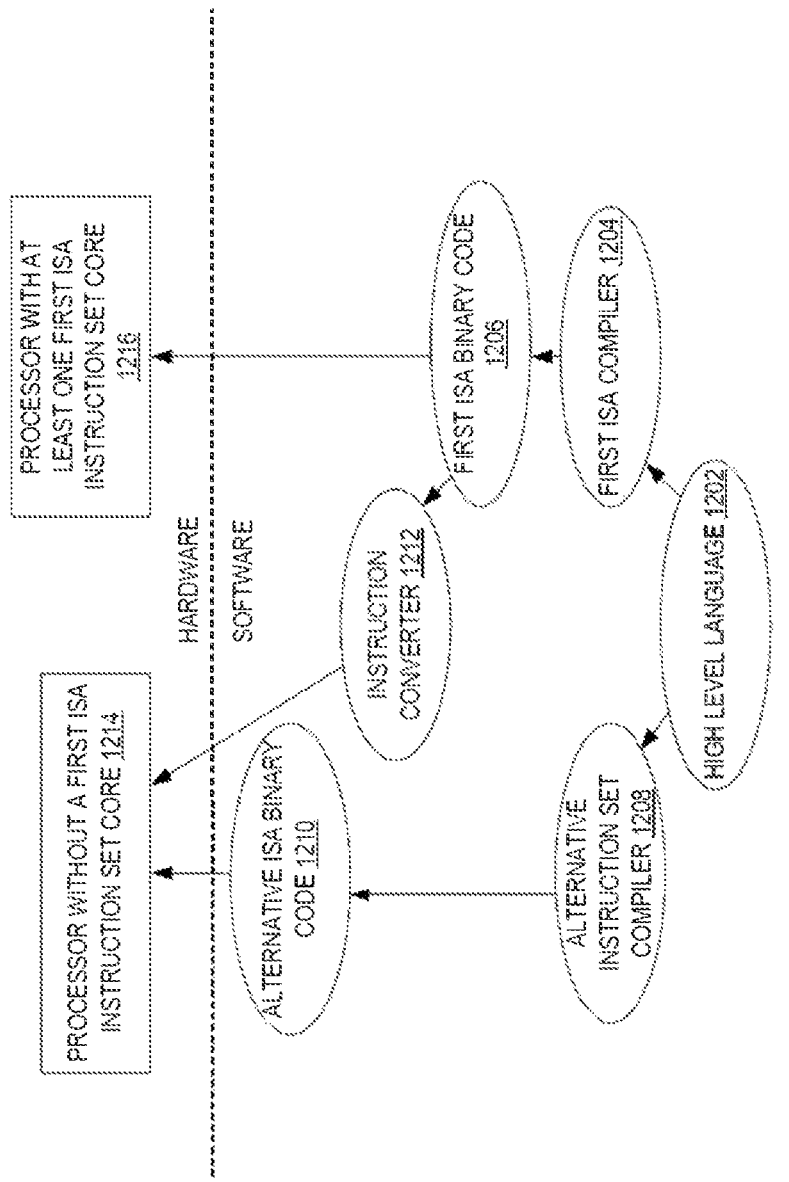
FIG. 12 illustrates instruction conversion and binary translation implementations.

FIG. 12 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first ISA compiler 1204 to generate first ISA binary code 1206 that may be natively executed by a processor with at least one first instruction set core 1216. The processor with at least one first ISA instruction set core 1216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1204 represents a compiler that is operable to generate first ISA binary code 1206 (e.g., object code) that can, with or without additional linkage processing, be executed on the processor with at least one first ISA instruction set core 1216.

Similarly, FIG. 12 shows the program in the high level language 1202 may be compiled using an alternative instruction set compiler 1208 to generate alternative instruction set binary code 1210 that may be natively executed by a processor without a first ISA instruction set core 1214. The instruction converter 1212 is used to convert the first ISA binary code 1206 into code that may be natively executed by the processor without a first ISA instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first ISA instruction set processor or core to execute the first ISA binary code 1206.

Apparatus and Method to Reduce Bandwidth and Latency Overheads of Probabilistic Caches Numerous DRAM technologies are currently in use including non-stacked DDR4 and LPDDR4, Pico modules, the JEDEC-standard High-Bandwidth Memory (HBM/HBM2) and Wide I/O (WIO3) stacks, and the dis-integrated RAM (DiRAM). In implementations such as HMB2, multiple DRAM die are stacked vertically in order to deliver higher bandwidth, tighter physical integration with the compute die, and lower energy/bit than traditional DRAM modules such as DDR4 DIMMs.

Figure 13A:
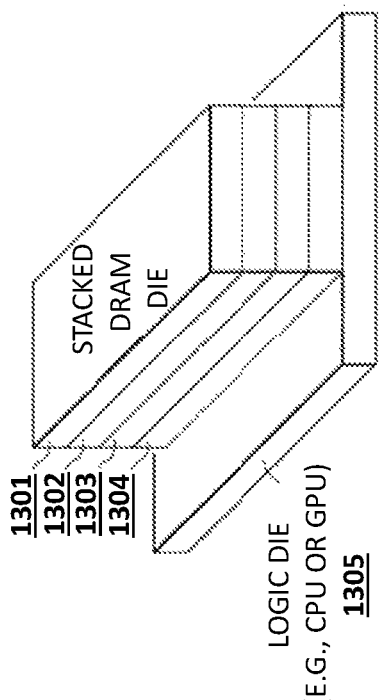
FIGS. 13A-B illustrate examples of a high bandwidth memory (HBM) implementation.
Figure 13B:
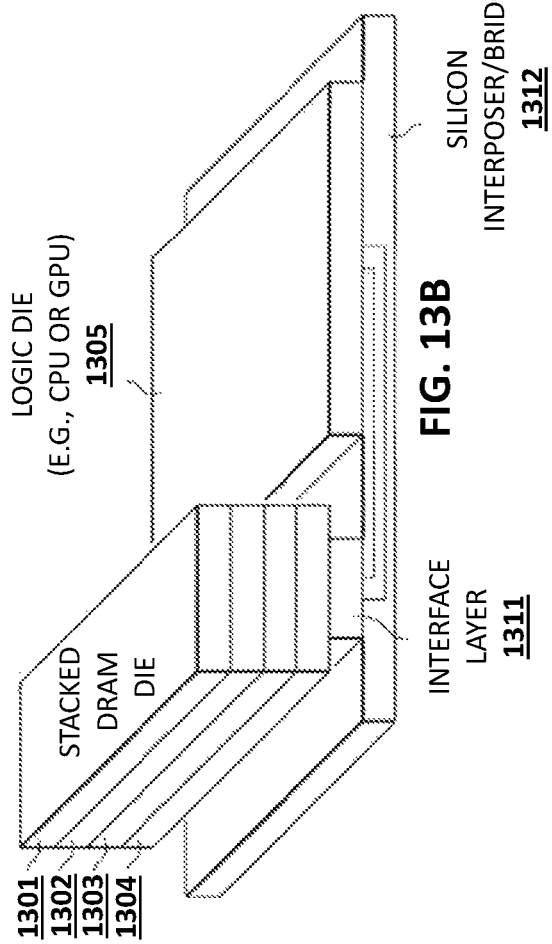

Referring to FIGS. 13A-B, stacked DRAMs come in two varieties: on-die (FIG. 13A) and beside-die (FIG. 13B). On-die stacks 1301-1304, as illustrated in FIG. 13A, connect directly to a logic die or SoC 1305 (e.g., such as a CPU or GPU) using through-silicon vias. In contrast, beside-die stacks 1301-1304, shown in FIG. 13B, are placed beside the logic/SoC die 1305 on a silicon interposer or bridge 1312, with the connections between the DRAM and the logic die 1305 running through the interposer 1312 and an interface layer 1311. On-die DRAM stacks have the advantage that they allow smaller packages than beside-die stacks but have the disadvantage that it is difficult to attach more than one stack to a logic die, limiting the amount of memory per die. In contrast, the use of a silicon interposer 1312 allows a logic die 1305 to communicate with multiple beside-die stacks, albeit at some cost in area.

In HBM implementations, the DRAM dies 1301-1304 are tightly coupled to the logic die 1305 over a distributed memory interface, which is divided into multiple independent channels. For example, a typical arrangement may include four stacked DRAM dies 1301-1304, with each die coupled to dual independent channels (channels 0 and 1).

The HBM DRAM dies use a wide-interface architecture with a 128 bit data bus operating at double data rate (DDR). HBM2 implementations may further subdivide each physical channel into two pseudo-channels, which share the channel's row and column command bus and clocking inputs, but decode and execute commands individually.

In implementations where HBM is configured as a cache, the HBM cache is typically direct-mapped because the size of the HBM storage capacity (e.g., 10s of GBs) makes separate tag arrays impractical. Consequently, each tag is stored along with the corresponding cache line. A probabilistic-2way (P2w) cache has been used to alleviate the conflicts inherent in such direct mapped caches. Such a configuration is used, for example, with Optane™ memory in two-level memory (2LM) mode. However, P2w caches significantly increase the bandwidth and miss-latency of a direct mapped cache, making P2w caches unattractive for productization.

Embodiments of the invention dramatically reduce these bandwidth and miss latency overheads (over 80% and 33% respectively) making P2w caches a viable solution for HBM caches. Further, these embodiments allow such caches to be extended efficiently beyond two ways and to be dynamically configured between direct-mapped and P2w caches at runtime.

An overview of P2w caches will initially be provided with respect to FIGS. 14A-C. FIG. 14A assumes a 16-line (16-set) direct-mapped cache used with a 256-line memory (i.e., an 8-bit address for accessing 256 lines). Out of these 8 bits, the 4 least significant bits (LSBs) are used as an index 1402 to the cache, to identify one of the 16 cache entries, and the 4 most significant bits (MSBs) are used as the tag 1401 (i.e., to distinguish between the 16 lines of memory which are mapped to each entry).

While FIG. 14A illustrates a specific example of a tag using the 4 MSB and an index using the 4 LSB, other implementations may select bits from different positions within the address and/or combine groups of bits to form the tag and index. For example, one embodiment may use 2 MSBs plus 2 LSBs as the tag and the remaining 4 bits as the index.

Specific details such as these are used throughout this detailed description for the purpose of explanation. It should be noted, however, that the underlying principles of the invention are not limited to these specific details.

As illustrated in FIG. 14B, if the same cache is configured as a 2-way cache, there will be 8 sets, which uses 3 LSBs as the index 1412 to identify each set of cache entries and 5 MSBs as the tag 1411, to differentiate between 32 lines of memory which may be stored in each set.

FIG. 14C differentiates the four MSB of the 2-way tag 1521 and the LSB, referred to as X 1422. Assume X is used to always decide whether a line will wind up in way 0 (when X is 0) or way 1 (when X is 1). Then, the 2-way cache, in effect, becomes a direct mapped cache because the address mapping is fixed. However, if some lines with X=0 can be stored in way 1 and some lines with X=1 can be are permitted in way 0 based on a coin flip (say for 10% of the cache fills), this results in a probabilistic-2way (P2w) cache, because now, the way is not determined by X but by a probabilistic event.

In such a probabilistic cache, when lines with X=0 go to way 0 and lines with X=1 go to way 1, this is referred to as the "correct way", because it corresponds to the mapping in the direct-mapped cache. Conversely, when lines with X=0 go to way 1 and lines with X=1 go to way 0, this is referred to as the "wrong way".

With a P2w cache, a line L is looked up, first checking the correct way. If L is not in the correct way, then the wrong way is searched before declaring a cache miss (i.e., because in a P2w cache, L could be in the wrong way). Therefore, to detect a cache miss, two accesses to both ways are required, compared with only a single access for a direct-mapped cache, increasing both bandwidth and miss-latency. Since HBM caches can have high miss rates in some common situations (e.g., 30%-40%), this leads to a very high bandwidth and miss-latency overhead making current P2w caches unattractive.

To address these limitations, one embodiment of the invention includes an extra tag, in addition to the default tag, which functions as a "home directory entry" to store the tag of a line L that belongs in the correct-way but is intentionally placed in the wrong-way. Therefore, line L is looked up, by reading its correct-way, it can be determined immediately whether line L is present in either of the ways, completely eliminating the extra look up. The new tags may be only a few bits in HBM caches (e.g., only 3-bits for 64 GB HBM cache supporting ½ TB of physical memory), making it feasible to be implemented in a technology such as HBM3, which offers an extra 32-bits of space for a 64B cache line.

While specific memory/cache types and sizes are described below for the purpose of explanation, the underlying principles of the invention are not limited to these specific details. Rather, the embodiments described herein may be implemented using any type and/or size of cache and system memory. Moreover, while embodiments of the invention are described within the context of specific processor architectures, the underlying principles of the invention are not limited to any processor architecture or processor type. By way of example, and not limitation, the cache management techniques described herein may be implemented on central processing units (CPUs), graphics processors, and various forms of acceleration devices (e.g., machine learning accelerators, linear algebra accelerators, compression accelerators, etc).

The following example assumes a 64 GB HBM cache and 0.5 TB (512 GB) of physical memory per processor (e.g., CPU, GPU, etc). Such a processor requires an extra tag of 3 bits (i.e., $\log_2(512$ GB/64 GB)) per cache line in a direct-mapped cache. To implement a conventional 2-way cache in this system would require 4-bits per tag, since the number of sets would be half of that of the direct-mapped cache.

Figure 15:
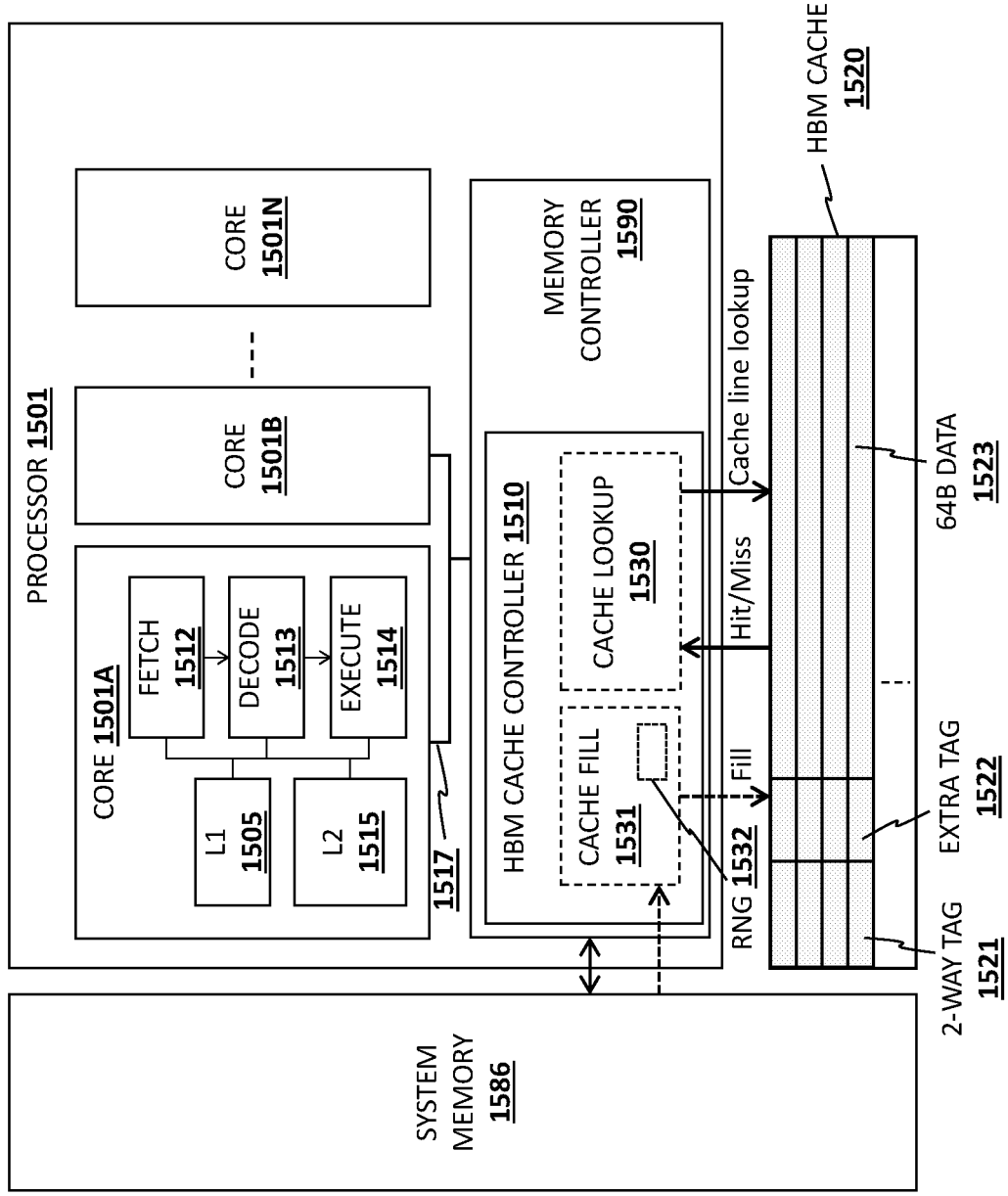
FIG. 15 illustrates one embodiment of an HBM cache and its associated cache controller.

FIG. 15 illustrates one example of a processor 1501 comprising a plurality of cores 1501A, 1501B, etc, coupled over an on-chip interconnect 1517 to a memory controller 1590 and an HBM cache controller 1510. While the HBM cache controller 1510 is shown integrated within the memory controller 1590, the HBM cache controller 1510 may be implemented as a separate unit coupled to the memory controller 1590 via the interconnect 1517. Certain details of one core 1501A are illustrated including instruction fetch circuitry 1512, an instruction decoder 1513, and execution circuitry 1514 for fetching, decoding, and executing instructions, respectively, and processing data associated with the instructions.

A level 1 (L1) cache 1505 and a Level 2 (L2) cache store data and instructions retrieved from a system memory 1586 via the memory controller 1590 and/or the HBM cache 1520 via the HBM cache controller 1510. Although not illustrated, a L3 cache may also be included in the processor 1501 and shared between the various cores 1501A, B. The other cores (e.g., core 1501B) may include identical processing architectures as core 1501A. Alternatively, one or more of the other cores may be heterogeneous with respect to core 1501A. For example, other cores may be configured to execute a different instruction set and/or may execute the same instruction set, but at a different level of power/performance than core 1501A.

In one embodiment, in response to a memory access request originating from one of the cores 1501A, B, etc, cache lookup logic 1530 of the HBM cache controller 1510 implements the techniques described herein to determine if the requested data is stored within the HBM cache 1520 using extra tag bits as described below. If the requested data is located within the HBM cache 1520, it is returned to the requesting core 1501A and may be cached within the core's L1 1505 and/or L2 cache 1515 in accordance with the cache management policy implemented on the processor 1501. In response to a miss in the HBM cache 1520, the memory controller 1590 retrieves the requested cache line from system memory 1586 and provides it to the requesting core 1501A. Cache fill logic 1531 of the HBM cache controller 1510 performs a cache fill operation, storing the cache line using the correct-way or wrong-way as described further below. In addition, the line may be cached in one or more of the core caches 1505, 1515 to be available for subsequent accesses by the respective core.

In one embodiment, the cache entries of the HBM cache 1520 include 64 Bytes of data 1523, a 2-way tag 1521, and an extra tag 1521. As shown in greater detail in FIG. 16, the two-way tag 1521 of 4 bits corresponds to the tag of the cache line which has its data (64B) 1523 stored in this HBM cache entry. The extra tag 1522 in this embodiment is only 3-bits as opposed to the 4-bits required for a 2-way cache (as described above). This is because the extra tag 1522 refers to a line that belongs in its correct way (but intentionally placed the wrong-way) and hence the LSB of the 2-way tag (i.e., bit X, as described above) can be inferred. For instance, for an extra tag 1522 placed in way 0, X is inferred to be 0 and for an extra tag 1522 placed in way 1, X is inferred to be 1. This saves 1-bit compared to a naïve implementation. To recover the full tag, bit X may be appended to the extra tag 1522.

In one embodiment, to invalidate the extra-tag 1522, it is made identical to the original tag (ignoring bit X, which can always be inferred). This saves an extra valid bit for the extra tag, which may be used by a naïve implementation. Therefore, in one implementation, the validity of the extra tag 1522 may be confirmed simply by comparing it to the 2-way tag 1521 (with its X bit removed).

The set of cache operations described below assume a look-up cache line (address) L which is processed by the cache lookup logic 1530 of the HBM cache controller 1510. The correct-way for cache line L is initially searched (determined by bit X of cache line L). Existing cache line E is read from the corresponding HBM cache entry and its original tag is compared with the tag of L. If there is a hit (i.e., the original tag of L matches the original tag of E), the data is returned to the core 1501A.

If there is a miss on the original tag comparison, the extra tag is evaluated. If the extra tag of cache line E is valid, it is compared with that of cache line L. If they match, this means that cache line L is stored in the wrong-way; cache line L is read from the wrong-way and the data returned to the core 1501A. If the extra tag is not valid or the extra tag does not match, a miss is declared in both ways and a cache line fill operation is initiated by the cache fill logic 1531.

To perform the cache line fill operation, a random number generator 1531 associated with and/or used by the cache fill logic 1531 generates a random number R. If R is within a specified range of all possible values for the random number, then the cache line is filled to the wrong-way. For example, the range may be defined as any number lower than a specified threshold, T (e.g., representing 10% of all possible values for the random number), or any number greater than the specified threshold, depending on the implementation. If the random number R is outside of the specified range, then the correct-way is used for the cache line fill operation.

In one embodiment, when filling the wrong-way with cache line L, the extra tag 1522 of the cache line entry in the correct-way (e.g., existing cache line E) is also updated to reflect the wrong-way location of cache line L. Consequently, both ways are modified, leading to extra overhead, but only when filling the wrong way.

When filling the correct-way with cache line L, there are two possibilities: (1) the existing cache line E is in its correct-way and (2) cache line E is in its wrong-way. If cache line E is already in its correct-way, then the correct-way fill operation can simply be performed with cache line L. If the extra tag 1522 of cache line E is already valid, it is preserved in cache line L; otherwise, the extra tag 1522 is marked as invalid (e.g., by making it identical to the 2-way tag 1521 in cache line L, minus the X bit). If the existing cache line E is in its wrong-way, its extra-tag 1522, which is already present in its correct-way, is invalidated.

Therefore, in this example, both ways are modified, leading to extra overhead but only when replacing a line placed in its wrong way. Alternatively, one embodiment omits invalidating the extra-tag in the correct way which would subsequently cause one spurious read to the wrong-way. When the extra-tag causes a spurious match, this is detected when both ways are missed, allowing it to be fixed upon cache filling.

Figure 17:
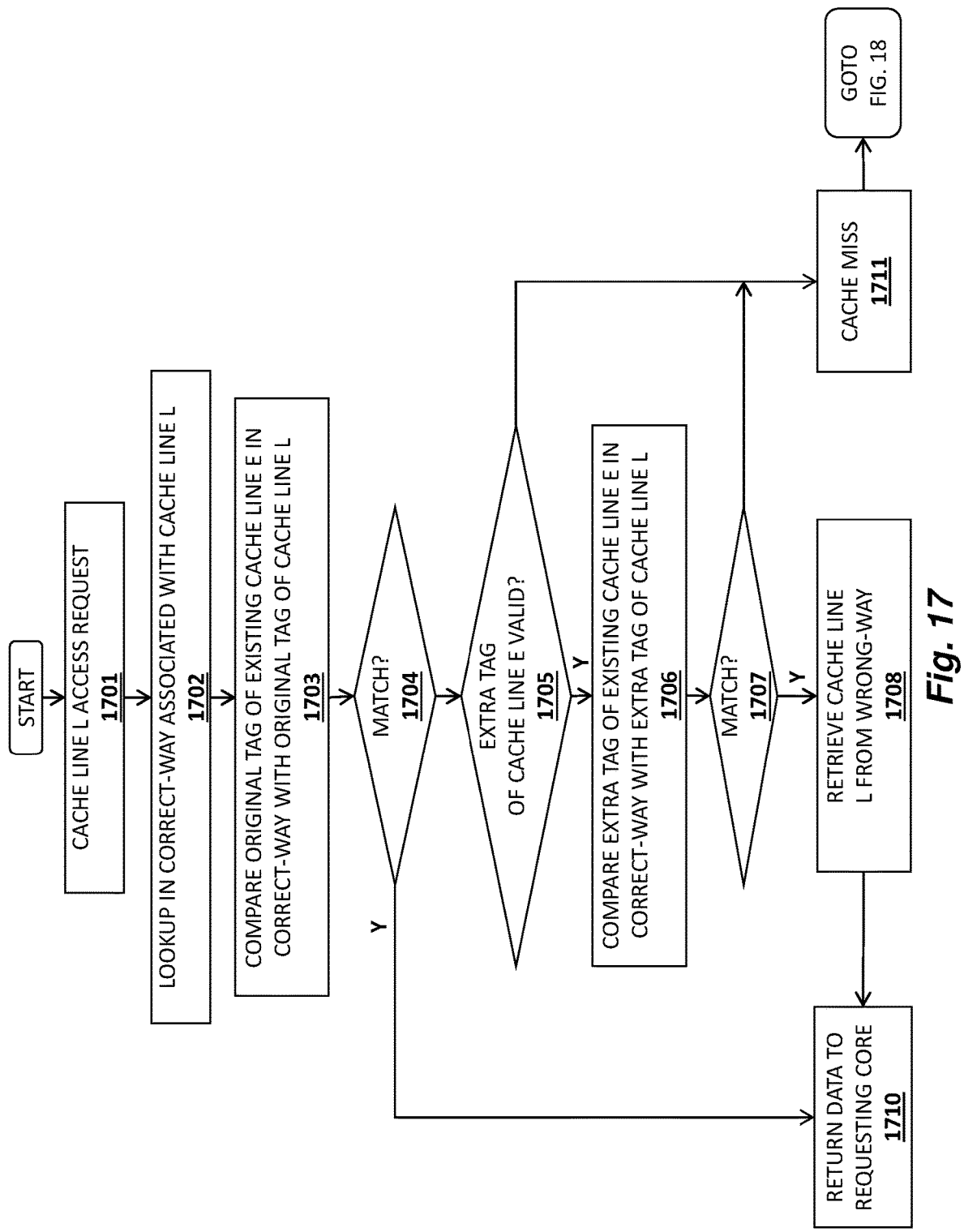
FIG. 17 illustrates a method for performing a cache lookup.

A method in accordance with one embodiment is illustrated in FIG. 17. The method may be implemented within the context of the processor and system architectures described herein, but is not limited to any particular architecture.

At 1701, an access request is received for cache line L. The correct-way for cache line L is initially searched at 1702. Existing cache line E is read from the corresponding HBM cache entry and its original tag is compared with the tag of L at 1703. If there is a hit, determined at 1704 (i.e., the original tag of L matches the original tag of E), the data is returned to the core at 1710.

If there is a miss on the original tag comparison at 1704, the extra tag is evaluated. If the extra tag of cache line E is valid, determined at 1705, it is compared with that of cache line L at 1706. If they match, determined at 1707, this means that cache line L is stored in the wrong-way; cache line L is read from the wrong-way at 1708 and the data returned to the core at 1710. If the extra tag is not valid or the extra tag does not match, a cache miss in both ways occurs at 1711 and a cache line fill operation is initiated.

Figure 18:
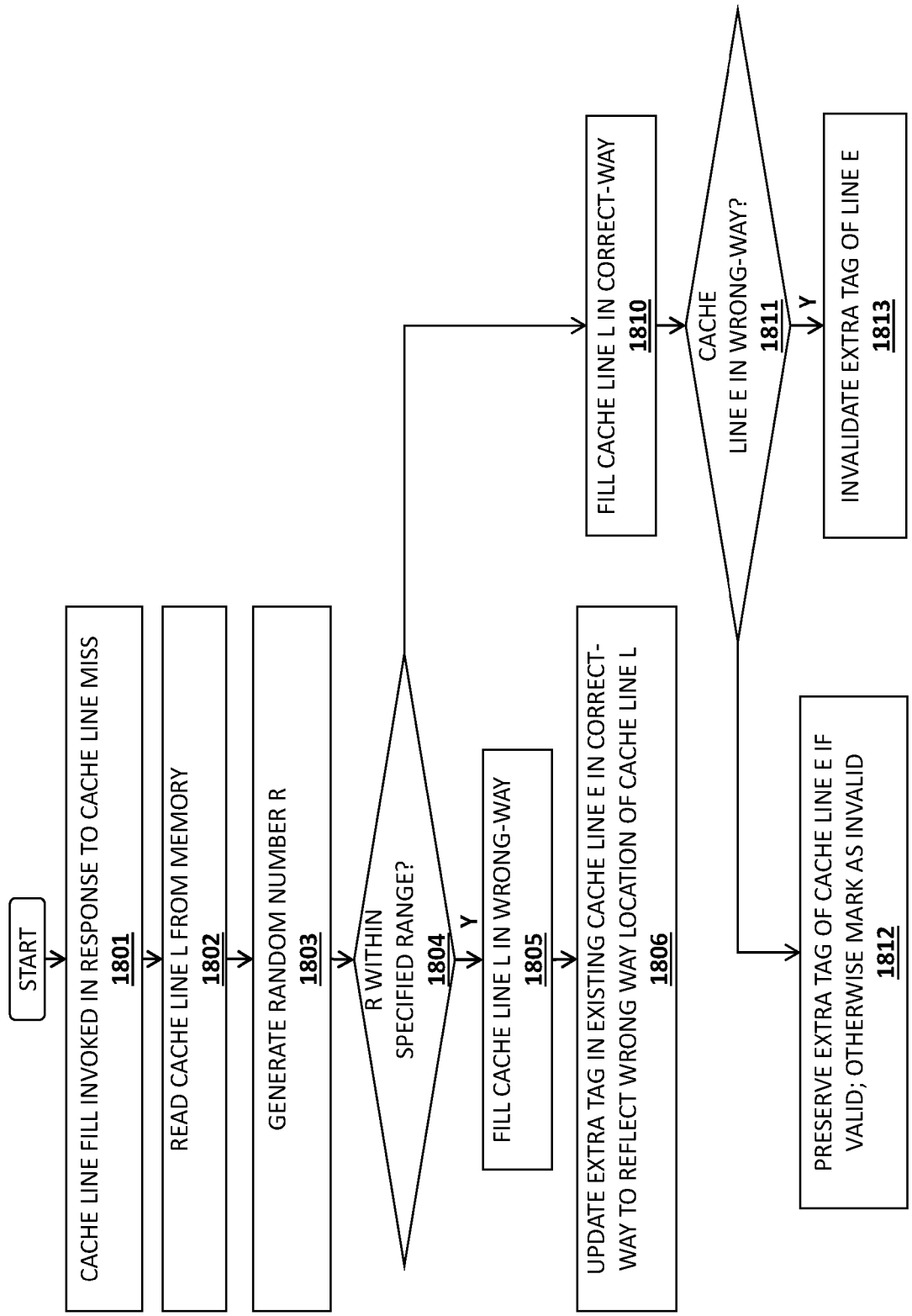
FIG. 18 illustrates one embodiment of a method for performing a cache fill.

One embodiment of a method for performing the cache fill is illustrated in FIG. 18. The method may be implemented within the context of the processor and system architectures described herein, but is not limited to any particular architecture.

At 1801, a cache line fill operation is initiated in response to the cache line miss. At 1802, the cache line L is read from memory and, at 1803, a random number R is generated. If R is within a specified range of possible values for the random number, determined at 1804, then the cache line is filled to the wrong-way at 1805. As mentioned, the specified range may be defined in various ways such as any number less than or greater than a specified threshold, T (e.g., representing 10% of all possible values for the random number). If the random number R is outside of the specified range, then the correct-way is used for the cache line fill operation at 1810.

In one embodiment, when filling the wrong-way with cache line L, the extra tag 1522 of the cache line entry in the correct-way (e.g., existing cache line E) is also updated at 1806 to reflect the wrong-way location of cache line L. Consequently, both ways are modified, leading to extra overhead, but only when filling the wrong way.

When filling the correct-way with cache line L, there are two possibilities determined at 1811: (1) the existing cache line E is in its correct-way and (2) cache line E is in its wrong-way. If cache line E is already in its correct-way, then the correct-way fill operation can simply be performed with cache line L and, at 1812, if the extra tag of cache line E is already valid, it is preserved in cache line L; otherwise, the extra tag is marked as invalid (e.g., by making it identical to the 2-way tag in cache line L). If the existing cache line E is in its wrong-way, then at 1813 its extra-tag, which is already present in its correct-way, is invalidated.

Various alternate embodiments of the invention may be realized through adjustments to the variables and operations described above. For example, while HBM is described in the above embodiments, various other memory/cache types may be used. Moreover, these same techniques may be implemented with respect to on-processor caches such as L3 caches, L2 caches, and L1 caches.

In addition, if the full extra-tag space is not available, a partial extra-tag (i.e., only 2 bits) may be used. In this case, extra memory reads will be needed for misses in the correct way and there is a partial extra-tag match. In general, as the size of the extra tag is reduced, miss-latency and bandwidth overhead are gradually increased.

Certain types of memories such as HBM3 allow updating of 32B cache lines. In one embodiment, when invalidating the correct-way tag (e.g., on an eviction of a wrong-way line), only the 32B portion containing the extra-tag is updated, further reducing the bandwidth overhead.

The embodiments described herein can also be used with higher associativity caches (e.g., 3-way set associative, 4-way set associative, etc) by introducing an additional tag for each wrong-way. In contrast, the baseline probabilistic cache becomes prohibitively expensive if associativity is increased; for instance, with a 4-way cache, it will require up to additional 3 memory accesses for every miss on the correct way. These embodiments also allow P2w caches to be more aggressive—i.e., increasing the probability of filling into the wrong way (e.g., from 10% to 20% or even 50%, where it becomes a conventional 2-way cache with random replacement).

In one embodiment, the HBM cache can be dynamically configured to operate in different modes based on workload characteristics. For example, the HBM cache may be adjusted from a P2w cache to a direct-mapped cache (or vice versa) at runtime. With a baseline P2w cache, if the decision is made at runtime to move to a direct-mapped cache (by always placing lines in the correct-way), the extra HBM reads are still required because there can be lines lingering in the wrong-way (we have to flush the entire HBM cache, if we needed to avoid extra reads). Since the extra HBM reads required by the embodiments of the invention are directly proportional to the amount of lines in the wrong way, one embodiment gradually moves to a direct mapped cache with minimal extra overhead by gradually reducing the percentage of lines placed in the wrong-way. For instance, at runtime, if hardware detects that the application footprint can completely fit within the HBM cache without conflicts (e.g., by monitoring accesses to physical memory pages and/or NUMA domains), moving to a direct mapped cache can improve performance.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1. A processor comprising: a plurality of cores to execute instructions and process data, one or more of the cores to generate a request for a first cache line; a cache controller comprising cache lookup logic to determine a first way of a cache in which to search for the first cache line based on a first set of tag bits comprising one or more bits associated with the first cache line; the cache lookup logic to compare a second set of tag bits of the first cache line with a third set of tag bits of an existing cache line stored in the first way, wherein if the second set of tag bits and the third set of tag bits to not match, then the cache lookup logic to determine that the first cache line is not in the first way and to compare a fourth set of tag bits of the first cache line with a fifth set of tag bits of the existing cache line, wherein responsive to a match between the fourth set of tag bits and the fifth set of tag bits, the cache lookup logic to determine that the first cache line is stored in a second way and to responsively read the first cache line from the second way.

Example 2. The processor of example 1 wherein responsive to determining that the fourth set of tag bits and the fifth set of tag bits match, the cache lookup logic to read the first cache line from the second way.

Example 3. The processor of example 1 wherein the first set of tag bits comprises a single bit, wherein the single bit is set to indicate that the cache lookup logic is to initially search for the first cache line in the first way.

Example 4. The processor of example 3 wherein each of the second and third set of tag bits comprise a 2-way tag of four bits and wherein each of the fourth and fifth set of tag bits comprise an extra tag of three bits.

Example 5. The processor of example 1 wherein responsive to determining that the fourth set of tag bits and the fifth set of tag bits do not match, the cache lookup logic to initiate a cache line fill operation.

Example 6. The processor of example 5 wherein the cache controller further comprises: cache fill logic to receive the first cache line read from a system memory and to determine whether to store the first cache line in the first way or the second way based on a value of a randomly-generated number.

Example 7. The processor of example 6 wherein the cache fill logic is to store the first cache line in the second way if the value of the randomly-generated number is less than a threshold value.

Example 8. The processor of example 7 wherein the threshold value is set based on a range of possible randomly-generated numbers.

Example 9. The processor of example 9 wherein the threshold value is set to provide a 10% likelihood of the randomly-generated number being less than the threshold value.

Example 10. The processor of example 9 wherein the threshold value is dynamically adjustable during runtime.

Example 11. The processor of example 10 wherein the cache controller comprises threshold adjustment logic to modify the threshold value based on characteristics of a current workload to be executed by the processor.

Example 12. The processor of example 1 wherein prior to comparing the fourth set of tag bits of the first cache line with the fifth set of tag bits of the existing cache line, the cache lookup logic to determine if the fifth set of tag bits are valid.

Example 13. The processor of example 12 wherein determining if the fifth set of tag bits are valid comprises comparing the fifth set of tag bits to the third set of tag bits.

Example 14. The processor of example 1 wherein the cache comprises a high bandwidth memory (HBM) cache.

Example 15. A method comprising: receiving an access request for a first cache line; determining a first way in which to search for the first cache line based on a first set of tag bits comprising one or more bits associated with the first cache line; comparing a second set of tag bits of the first cache line with a third set of tag bits of an existing cache line stored in the first way, wherein if the second set of tag bits and the third set of tag bits to not match, then determining that the first cache line is not in the first way and comparing a fourth set of tag bits of the first cache line with a fifth set of tag bits of the existing cache line, reading the first cache line from a second way responsive to determining a match between the fourth set of tag bits and the fifth set of tag bits.

Example 16. The method of example 15 wherein responsive to determining that the fourth set of tag bits and the fifth set of tag bits match, the cache lookup logic to read the first cache line from the second way.

Example 17. The method of example 15 wherein the first set of tag bits comprises a single bit, wherein the single bit is set to indicate that the cache lookup logic is to initially search for the first cache line in the first way.

Example 18. The method of example 17 wherein each of the second and third set of tag bits comprise a 2-way tag of four bits and wherein each of the fourth and fifth set of tag bits comprise an extra tag of three bits.

Example 19. The method of example 15 wherein responsive to determining that the fourth set of tag bits and the fifth set of tag bits do not match, the cache lookup logic to initiate a cache line fill operation.

Example 20. The method of example 19 wherein the cache controller further comprises: cache fill logic to receive the first cache line read from a system memory and to determine whether to store the first cache line in the first way or the second way based on a value of a randomly-generated number.

Example 21. The method of example 20 wherein the cache fill logic is to store the first cache line in the second way if the value of the randomly-generated number is less than a threshold value.

Example 22. The method of example 21 wherein the threshold value is set based on a range of possible randomly-generated numbers.

Example 23. The method of example 22 wherein the threshold value is set to provide a 10% likelihood of the randomly-generated number being less than the threshold value.

Example 24. The method of example 23 wherein the threshold value is dynamically adjustable during runtime.

Example 25. The method of example 24 wherein the cache controller comprises threshold adjustment logic to modify the threshold value based on characteristics of a current workload.

Example 26. The method of example 15 wherein prior to comparing the fourth set of tag bits of the first cache line with the fifth set of tag bits of the existing cache line, the cache lookup logic to determine if the fifth set of tag bits are valid.

Example 27. The method of example 26 wherein determining if the fifth set of tag bits are valid comprises comparing the fifth set of tag bits to the third set of tag bits.

Example 28. A machine-readable medium having program code stored thereon which, when executed by a machine, causes the machine to perform the operations of: receiving an access request for a first cache line; determining a first way in which to search for the first cache line based on a first set of tag bits comprising one or more bits associated with the first cache line; comparing a second set of tag bits of the first cache line with a third set of tag bits of an existing cache line stored in the first way, wherein if the second set of tag bits and the third set of tag bits to not match, then determining that the first cache line is not in the first way and comparing a fourth set of tag bits of the first cache line with a fifth set of tag bits of the existing cache line, reading the first cache line from a second way responsive to determining a match between the fourth set of tag bits and the fifth set of tag bits.

Example 29. The method of claim 28 wherein responsive to determining that the fourth set of tag bits and the fifth set of tag bits match, the cache lookup logic to read the first cache line from the second way.

Example 30. The method of claim 28 wherein the first set of tag bits comprises a single bit, wherein the single bit is set to indicate that the cache lookup logic is to initially search for the first cache line in the first way.

Example 31. The method of claim 30 wherein each of the second and third set of tag bits comprise a 2-way tag of four bits and wherein each of the fourth and fifth set of tag bits comprise an extra tag of three bits.

Example 32. The method of claim 28 wherein responsive to determining that the fourth set of tag bits and the fifth set of tag bits do not match, the cache lookup logic to initiate a cache line fill operation.

Example 33. The method of claim 32 wherein the cache controller further comprises: cache fill logic to receive the first cache line read from a system memory and to determine whether to store the first cache line in the first way or the second way based on a value of a randomly-generated number.

Example 34. The method of claim 33 wherein the cache fill logic is to store the first cache line in the second way if the value of the randomly-generated number is less than a threshold value.

Example 35. The method of claim 34 wherein the threshold value is set based on a range of possible randomly-generated numbers.

Example 36. The method of claim 35 wherein the threshold value is set to provide a 10% likelihood of the randomly-generated number being less than the threshold value.

Example 37. The method of claim 36 wherein the threshold value is dynamically adjustable during runtime.

Example 38. The method of claim 37 wherein the cache controller comprises threshold adjustment logic to modify the threshold value based on characteristics of a current workload.

Example 39. The method of claim 28 wherein prior to comparing the fourth set of tag bits of the first cache line with the fifth set of tag bits of the existing cache line, the cache lookup logic to determine if the fifth set of tag bits are valid.

Example 40. The method of claim 39 wherein determining if the fifth set of tag bits are valid comprises comparing the fifth set of tag bits to the third set of tag bits.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
receiving an access request for a first cache line;
determining a first way in which to search for the first cache line based on a first set of tag bits comprising one or more bits associated with the first cache line;
comparing a second set of tag bits of the first cache line with a third set of tag bits of an existing cache line stored in the first way,
wherein if the second set of tag bits and the third set of tag bits do not match, then determining that the first cache line is not stored in the first way and comparing a fourth set of tag bits of the first cache line with a fifth set of tag bits of the existing cache line,
reading the first cache line from a second way responsive to determining a match between the fourth set of tag bits and the fifth set of tag bits.

2. The method of claim 1 wherein responsive to determining that the fourth set of tag bits and the fifth set of tag bits match, the cache lookup logic to read the first cache line from the second way.

3. The method of claim 1 wherein the first set of tag bits comprises a single bit, wherein the single bit is set to indicate that the cache lookup logic is to initially search for the first cache line in the first way.

4. The method of claim 3 wherein each of the second and third set of tag bits comprise a 2-way tag of four bits and wherein each of the fourth and fifth set of tag bits comprise an extra tag of three bits.

5. The method of claim 1 wherein responsive to determining that the fourth set of tag bits and the fifth set of tag bits do not match, the cache lookup logic to initiate a cache line fill operation.

6. The method of claim 5 wherein the cache controller further comprises:
cache fill logic to receive the first cache line read from a system memory and to determine whether to store the first cache line in the first way or the second way based on a value of a randomly-generated number.

7. The method of claim 6 wherein the cache fill logic is to store the first cache line in the second way if the value of the randomly-generated number is less than a threshold value.

8. The method of claim 7 wherein the threshold value is set based on a range of possible randomly-generated numbers.

9. The method of claim 8 wherein the threshold value is set to provide a 10% likelihood of the randomly-generated number being less than the threshold value.

10. The method of claim 9 wherein the threshold value is dynamically adjustable during runtime.

11. The method of claim 10 wherein the cache controller comprises threshold adjustment logic to modify the threshold value based on characteristics of a current workload.

12. The method of claim 1 wherein prior to comparing the fourth set of tag bits of the first cache line with the fifth set of tag bits of the existing cache line, the cache lookup logic to determine if the fifth set of tag bits are valid.

13. The method of claim 12 wherein determining if the fifth set of tag bits are valid comprises comparing the fifth set of tag bits to the third set of tag bits.

14. A processor comprising:
a plurality of cores to execute instructions and process data, one or more of the cores to generate a request for a first cache line;
a cache controller comprising cache lookup logic to determine a first way of a cache in which to search for the first cache line based on a first set of tag bits comprising one or more bits associated with the first cache line;
the cache lookup logic to compare a second set of tag bits of the first cache line with a third set of tag bits of an existing cache line stored in the first way,
wherein if the second set of tag bits and the third set of tag bits to do not match, then the cache lookup logic to determine that the first cache line is not stored in the first way and to compare a fourth set of tag bits of the first cache line with a fifth set of tag bits of the existing cache line,
wherein responsive to a match between the fourth set of tag bits and the fifth set of tag bits, the cache lookup logic to determine that the first cache line is stored in a second way and to responsively read the first cache line from the second way.

15. The processor of claim 14 wherein responsive to determining that the fourth set of tag bits and the fifth set of tag bits match, the cache lookup logic to read the first cache line from the second way.

16. The processor of claim 14 wherein the first set of tag bits comprises a single bit, wherein the single bit is set to indicate that the cache lookup logic is to initially search for the first cache line in the first way.

17. The processor of claim 16 wherein each of the second and third set of tag bits comprise a 2-way tag of four bits and wherein each of the fourth and fifth set of tag bits comprise an extra tag of three bits.

18. The processor of claim 14 wherein responsive to determining that the fourth set of tag bits and the fifth set of tag bits do not match, the cache lookup logic to initiate a cache line fill operation.

19. The processor of claim 18 wherein the cache controller further comprises:
cache fill logic to receive the first cache line read from a system memory and to determine whether to store the first cache line in the first way or the second way based on a value of a randomly-generated number.

20. The processor of claim 19 wherein the cache fill logic is to store the first cache line in the second way if the value of the randomly-generated number is less than a threshold value.

21. The processor of claim 20 wherein the threshold value is set based on a range of possible randomly-generated numbers.

22. The processor of claim 20 wherein the threshold value is set to provide a 10% likelihood of the randomly-generated number being less than the threshold value.

23. The processor of claim 22 wherein the threshold value is dynamically adjustable during runtime.

24. The processor of claim 23 wherein the cache controller comprises threshold adjustment logic to modify the threshold value based on characteristics of a current workload to be executed by the processor.

25. The processor of claim 14 wherein prior to comparing the fourth set of tag bits of the first cache line with the fifth set of tag bits of the existing cache line, the cache lookup logic to determine if the fifth set of tag bits are valid.

26. The processor of claim 25 wherein determining if the fifth set of tag bits are valid comprises comparing the fifth set of tag bits to the third set of tag bits.

27. The processor of claim 14 wherein the cache comprises a high bandwidth memory (HBM) cache.

28. A machine-readable medium having program code stored thereon which, when executed by a machine, causes the machine to perform the operations of:

receiving an access request for a first cache line;
determining a first way in which to search for the first cache line based on a first set of tag bits comprising one or more bits associated with the first cache line;
comparing a second set of tag bits of the first cache line with a third set of tag bits of an existing cache line stored in the first way,
wherein if the second set of tag bits and the third set of tag bits do not match, then determining that the first cache line is not stored in the first way and comparing a fourth set of tag bits of the first cache line with a fifth set of tag bits of the existing cache line,
reading the first cache line from a second way responsive to determining a match between the fourth set of tag bits and the fifth set of tag bits.

29. The method of claim 28 wherein responsive to determining that the fourth set of tag bits and the fifth set of tag bits match, the cache lookup logic to read the first cache line from the second way.

30. The method of claim 28 wherein the first set of tag bits comprises a single bit, wherein the single bit is set to indicate that the cache lookup logic is to initially search for the first cache line in the first way.

31. The method of claim 30 wherein each of the second and third set of tag bits comprise a 2-way tag of four bits and wherein each of the fourth and fifth set of tag bits comprise an extra tag of three bits.

32. The method of claim 28 wherein responsive to determining that the fourth set of tag bits and the fifth set of tag bits do not match, the cache lookup logic to initiate a cache line fill operation.

33. The method of claim 32 wherein the cache controller further comprises:
cache fill logic to receive the first cache line read from a system memory and to determine whether to store the first cache line in the first way or the second way based on a value of a randomly-generated number.

34. The method of claim 33 wherein the cache fill logic is to store the first cache line in the second way if the value of the randomly-generated number is less than a threshold value.

35. The method of claim 34 wherein the threshold value is set based on a range of possible randomly-generated numbers.

36. The method of claim 35 wherein the threshold value is set to provide a 10% likelihood of the randomly-generated number being less than the threshold value.

37. The method of claim 36 wherein the threshold value is dynamically adjustable during runtime.

38. The method of claim 37 wherein the cache controller comprises threshold adjustment logic to modify the threshold value based on characteristics of a current workload.

39. The method of claim 28 wherein prior to comparing the fourth set of tag bits of the first cache line with the fifth set of tag bits of the existing cache line, the cache lookup logic to determine if the fifth set of tag bits are valid.

40. The method of claim 39 wherein determining if the fifth set of tag bits are valid comprises comparing the fifth set of tag bits to the third set of tag bits.

* * * * *